US007747867B2

(12) United States Patent  
Yim et al.

(10) Patent No.: US 7,747,867 B2
(45) Date of Patent: Jun. 29, 2010

(54) USER AUTHENTICATION METHOD FOR A REMOTE CONTROL APPARATUS AND A REMOTE CONTROL APPARATUS

(75) Inventors: Kyeong-Su Yim, Suwon-si (KR); Yang-Gi Kim, Seoul (KR); Jeong-Soo Lee, Yongin-si (KR); Eun-Kyu Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 1945 days.

(21) Appl. No.: 10/726,647

(22) Filed: Dec. 4, 2003

(65) Prior Publication Data

US 2004/0186995 A1    Sep. 23, 2004

(30) Foreign Application Priority Data

Mar. 20, 2003    (KR) .................. 10-2003-0017508

(51) Int. Cl.
   *G06F 9/00*    (2006.01)
(52) U.S. Cl. .................. 713/182; 713/189; 713/193
(58) Field of Classification Search .................. 713/182, 713/189, 193
   See application file for complete search history.

(56) References Cited

U.S. PATENT DOCUMENTS

| 5,499,297 | A  | * | 3/1996  | Boebert .................. 713/159 |
| 5,990,803 | A  |   | 11/1999 | Park .................. 340/825.34 |
| 6,256,019 | B1 |   | 7/2001  | Allport .................. 345/169 |
| 6,310,966 | B1 | * | 10/2001 | Dulude et al. .................. 382/115 |
| 6,484,260 | B1 | * | 11/2002 | Scott et al. .................. 713/186 |
| 6,535,978 | B1 | * | 3/2003  | Padgett et al. .................. 713/156 |
| 6,556,680 | B1 | * | 4/2003  | Leonardi .................. 380/247 |
| 2002/0043557 | A1 |   | 4/2002 | Mizoguchi et al. .................. 235/375 |

OTHER PUBLICATIONS

European Search Report dated Apr. 25, 2005.
Chinese Office Action dated Jun. 16, 2006.
Design and Implementation of a Security Attestation System Based on IP and Password; Oct. 2000; Xiao Xiaojun, Yang Yuexiang, Qu Grouping; (Computer School of NUDT, Changsha 410073); 2 pages.

* cited by examiner

*Primary Examiner*—Thomas R Peeso
(74) *Attorney, Agent, or Firm*—Ked & Associates LLP

(57) ABSTRACT

A user authentication method for a remote control apparatus and a remote control apparatus using this method are provided. If a user inputs information for user authentication after having inputted a command for control of a controlled device, this information is compared with the corresponding user authentication information stored. If the user authentication is successful, it is determined whether a secondary authentication is required. If a secondary authentication is required, authentication data, as well as control data corresponding to the user's command, are transmitted to the controlled device. The controlled device operates in accordance with the received control data, if the authentication with the received authentication data was successful. The method and apparatus allow individual setting of a communication device for each controlled device. Further, data for secondary authentication may be transmitted first to a controlled device, and then, controlled data transmitted after the secondary authentication is completed successfully.

23 Claims, 9 Drawing Sheets

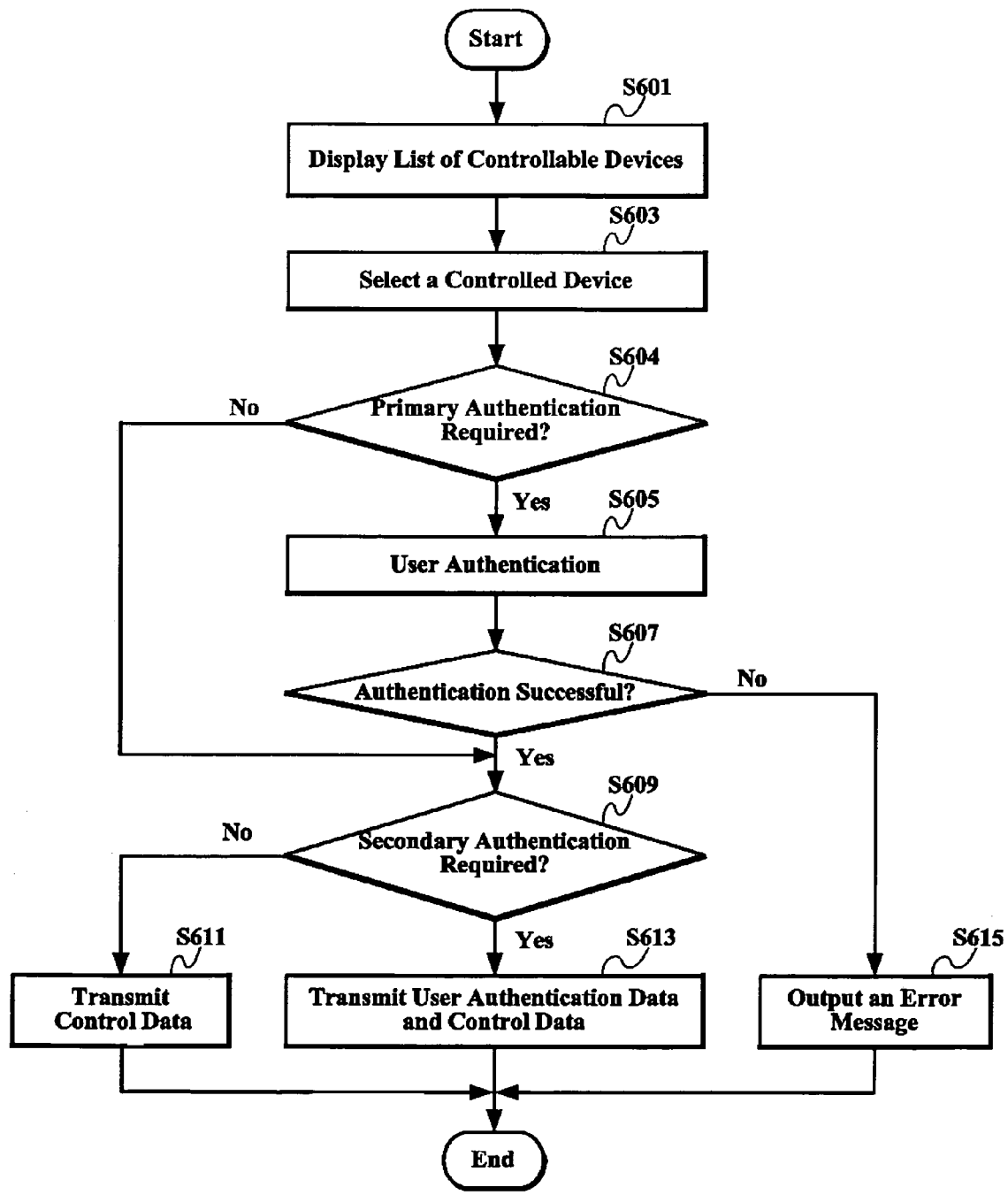

| Controlled Device | Primary Authentication | Secondary Authentication | Communication Unit | Control Data |
|---|---|---|---|---|
| Entrance | Y | Y | 1 | 3E24h |
| Gas Cooker ON | Y | Y | 1 | 3945h |
| Gas Cooker OFF | Y | N | 1 | 3946h |
| VTR Recording | Y | N | 2 | 11011011 |
| Living Room Light | N | N | 2 | 10101100 |
| Bed Room Light | N | N | 2 | 10111100 |
| TV ON/OFF | N | N | 2 | 11001010 |
| TV Channel Up | N | N | 2 | 11001100 |
| TV Channel Down | N | N | 2 | 11001101 |

USER AUTHENTICATION METHOD FOR A REMOTE CONTROL APPARATUS AND A REMOTE CONTROL APPARATUS

BACKGROUND OF THE INVENTION

1. Field of the Invention

The invention generally relates to a user authentication method for a remote control apparatus and a remote control apparatus.

2. Background of the Related Art

Various controllers capable of remotely controlling long or short distant devices are known, such as controllers that control TV sets, controllers that control household appliances via telephone network, etc. A wide variety of devices are in use, ranging from single purpose controllers, such as a vehicle remote starter, an electronic door key using radio signals, etc., to general purpose devices, such as a telephone, a mobile telephone, a PDA (Personal Digital Assistant), a computer, etc. For transmission of the control signals, divergent means, such as infrared rays, ultrasonic waves, RF (Radio Frequencies), telephone networks, the Internet, etc. are in use. It is also possible that a plurality of devices are controlled by a single controller, for example, a plurality of doors can be unlocked by a mobile telephone or a PDA, or a controller can control both a TV set and a DVD player.

There can be instances where authentication of a valid user is required for controlling a control device. For example, a process of user authentication by inputting a password or a fingerprint may be required for starting a heating apparatus, or for opening a house door. Such an authentication process can be performed at the controller, at the controlled device, or at both. The more authentication processes, the better the security. However, additional authentication processes reduce convenience in use.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

In order to achieve at least the above objects, in whole or in part, and in accordance with the purposes of the invention, as embodied and broadly described, there is provided a user authentication method for a remote control apparatus comprising performing a first user authentication process after the user has input a command for control of a controlled device, confirming whether a secondary authentication for said controlled device is required, if said user authentication was successful, and performing a secondary authentication process if the secondary authentication process is necessary.

To further achieve at least the above objects, in whole or in part, and in accordance with the purposes of the invention, as embodied and broadly described, there is provided a user authentication method for a remote control apparatus comprising performing a first user authentication process after the user has input a command for control of a controlled device, confirming whether a secondary authentication for said controlled device is required, if said user authentication was successful, performing a secondary authentication process, if the secondary authentication process is necessary, transmitting authentication data and control data corresponding to said user's command to the controlled device, if a secondary authentication is required, and operating the controlled device in accordance with said transmitted data, if authentication at the controlled device with said authentication data was successful.

To further achieve at least the above objects, in whole or in part, and in accordance with the purposes of the invention, as embodied and broadly described, there is provided a remote control apparatus comprising an input unit configured for input of information by a user, a memory unit configured to store control data for controllable devices, primary and secondary authentication information for said controllable devices, and authentication data for user authentication, a communication unit configured to transmit control data of said controllable devices, and a processing unit configured to confirm whether a primary and/or secondary authentication is required for said controllable device, and perform the primary and/or secondary authentication.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 6 is a flow chart showing operations of a controller such as that shown in FIG. 5A with an additional step of confirming as to whether a primary authentication is required;

DETAILED DESCRIPTION OF PREFERRED EMBODIMENTS

Reference will now be made in detail to embodiments of the invention with reference to the accompanying drawings, in which like reference numbers have been used to indicate like elements. The following embodiments are intended not to limit the scope of the claims. Many alternatives, modifications, and variations will be apparent to those skilled in the art.

Figure 1:
FIG. 1 is a block diagram showing how a control device is controlled remotely using a controller.

FIG. 1 is a block diagram showing a controlled device 200 controlled remotely using a controller 100 according to an embodiment of the invention. The controller 100 is provided with remote control capabilities and is thus a "remote control apparatus." The controller 100 may be, for example, a mobile telephone, a PDA, a telephone, etc. The term "controlled device" refers to any device suitable to be an object of control by a controller, or remote control apparatus, according to the invention, including but not limited to, an entrance lock for entry to, for example, a building or vehicle, household appliances, such as a gas cooker, a gas valve, or a heating and/or cooling apparatus, a VTR recording device, lighting, a TV, a DVD player or recorder, a VCR, other stereo equipment, a telephone, a PDA, a computer, etc. Further, any communication means for short distance communication, such as infrared ray, Bluetooth, etc., or for long distance communication, such as the Internet, PSTN (Public Switched Telephone Network), mobile telephone network, etc. can be used for communications between the controller 100 and the controlled device 200.

Figure 2A:
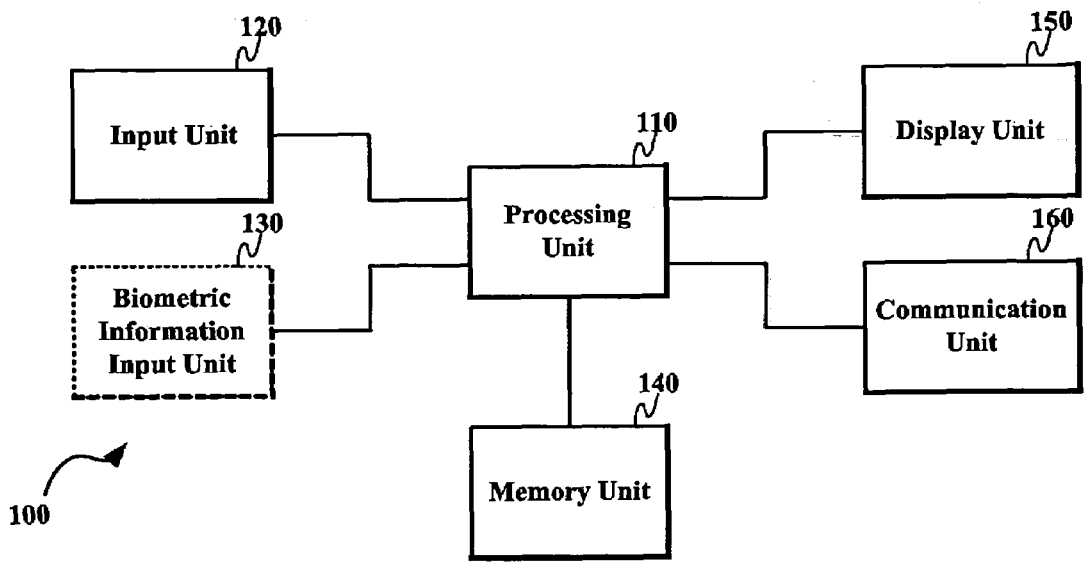
FIG. 2A is block diagram of a controller according to an embodiment of the invention, having one external communication unit.
Figure 2B:
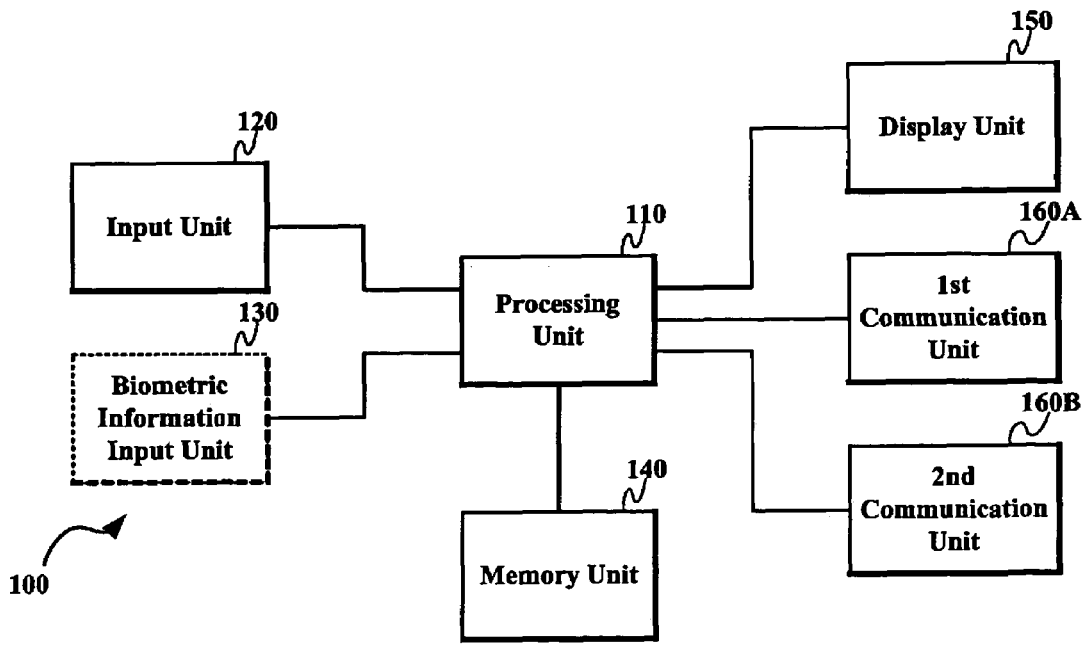
FIG. 2B is block diagram of a controller according to an embodiment of the invention, having two external communication units.

FIGS. 2A and 2B are block diagrams of a controller according to embodiments of the invention. FIG. 2A shows a controller according to an embodiment of the invention, having one external communication unit. FIG. 2B shows a controller according to an embodiment of the invention, having two external communication units.

The input unit 120 is configured to input various control commands and an authentication data, such as an authentication number, for user authentication. The input unit 120 may be, for example, a touch screen, a key or button type input device, a mouse, etc.

The biometric information input unit 130 is a device configured to input biometric information, such as fingerprint, iris, etc., information of a user for user authentication. For example, a fingerprint recognition sensor may be used as the biometric information input unit 130 if fingerprints are to be used for user authentication. Alternatively, an iris recognition sensor may be used as the biometric information input unit 130 if the iris is to be used for user authentication. Also, if no biometric information is to be used for user authentication, the biometric information input unit may be omitted.

Figures 7, 8:
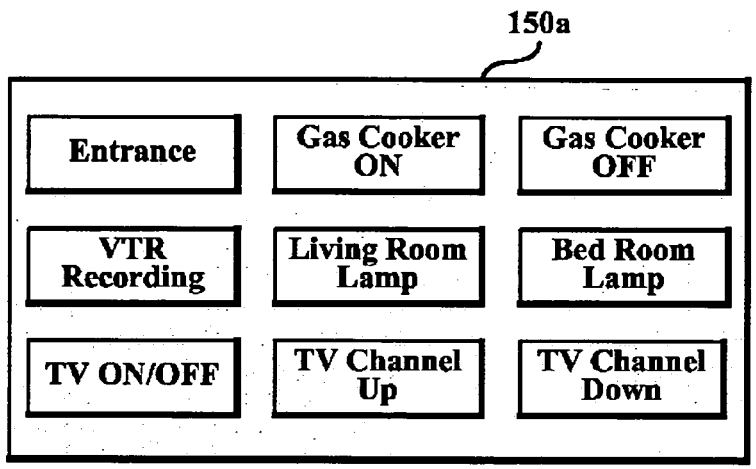
FIG. 7 is an example screen showing devices to be controlled by a controller.
FIG. 8 is an example screen showing information on the devices to be controlled by a controller.

The memory unit 140 is configured to store information on devices to be controlled by a controller, and information on primary and secondary user authentication. FIG. 8 is a table of examples of devices to be controlled by the controller. A selection of a primary authentication at the controller 100 and a secondary authentication at the controlled device 200 is allowed for each controlled device or specific function of controlled devices. FIG. 8 further shows examples in which the controller comprises two communication units, allowing selection of one of the two communication units for each controlled device. The table in FIG. 8 may vary from one embodiment to another. For example, where the controller comprises only one communication unit, the column entitled communication unit may be omitted. Likewise, where a primary authentication is obligatory, or where no primary authentication is performed, the column entitled primary authentication may be omitted.

The memory unit 140 further stores information required for general operation of the controller 100. For example, if the controller 100 is a mobile phone, information for the mobile telephone, such as a telephone directory, ring tone information, mobile phone set up information, etc. can be stored in the memory unit as well.

The display unit 150 is configured to display various states of the controller 100 and information for a user. The display 150 may be embodied by many different displays, such as a LED (Light Emitting Diode) display, a LCD (Liquid Crystal Display) display, etc. When a single-line telephone, for example, or similar device is used, as the controlled device, the display unit 150 can be omitted.

The communication unit 160 is configured to transmit authentication information between the controller 100 and the controlled device 200. For example, if the controller 100 is a single-line telephone, a central office line interface circuit may function as the communication unit 160. On the other hand, if the controller 100 is a mobile phone, a mobile telephone network interface circuit may function as the communication unit 160. Further, for a remote control apparatus using infrared rays an infrared ray communication network interface circuit may function as the communication unit 160, while for a remote controller using short distance radio communication means such as Bluetooth, a radio communication circuit may function as the communication unit 160.

A controller 100 which uses mobile communication network interface circuit as its main communication device, such as a mobile telephone with an additional device for infrared ray communication or Bluetooth function, may comprise a separate or second communication unit 160B in addition to a main or first communication unit 160A, as shown in FIG. 2B.

There may also be cases in which a PDA is the controller and comprises one or more of a infrared ray communication interface, mobile communication network interface, or Bluetooth interface as its communication means. Thus, the number of communication units which the controller 100 may comprise is not limited.

The processing unit 110 controls the general operations of a controller 100. However, if a controller 100 is not specifically designed to control exclusively a particular controlled device 200, but rather is a general controller, such as a mobile telephone or PDA, the processing unit 110 may be used to also control the general operations of the mobile phone or the PDA, as well. However, it is also possible that a processing unit that controls the general operations of the controller is provided separate from the processing unit that controls general operations of the mobile telephone or PDA.

Figure 3A:
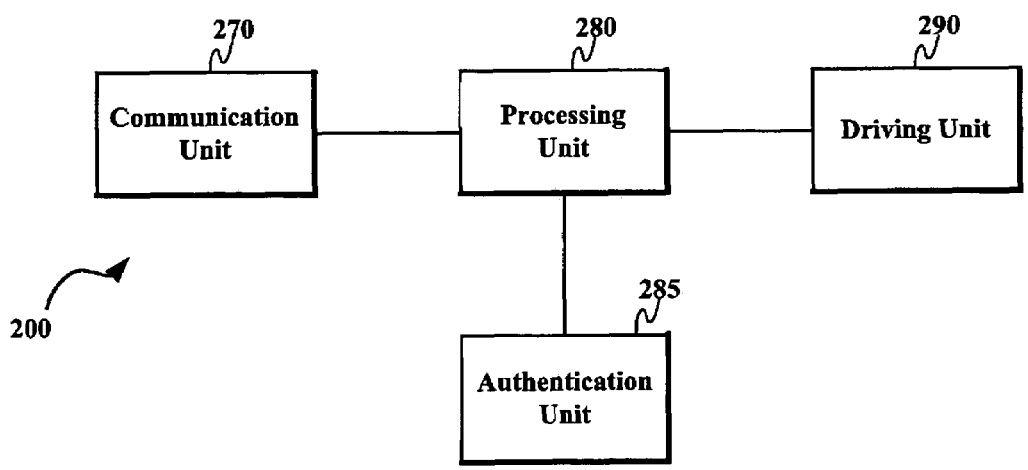
FIG. 3A is a block diagram of a controlled device according to an embodiment of the invention, having an authentication unit.
Figure 3B:
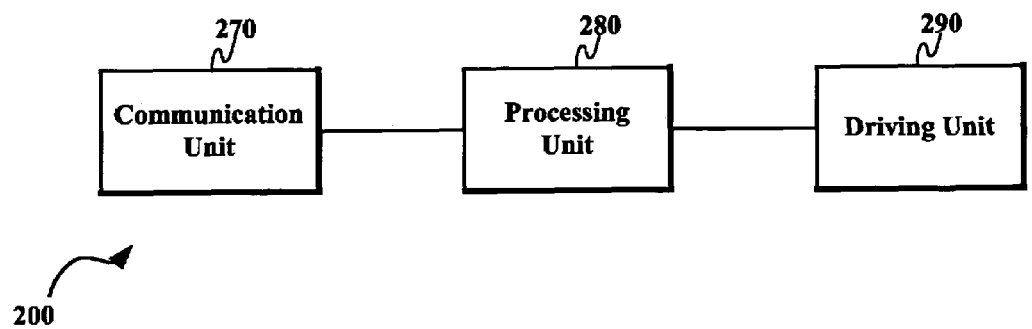
FIG. 3B is a block diagram of a controlled device according to an embodiment of the invention, having no authentication unit.

FIGS. 3A and 3B are block diagrams of a controlled device according to embodiments of the invention. FIG. 3A shows a controlled device according to an embodiment of the invention, having an authentication unit. FIG. 3B shows a controlled device according to an embodiment of the invention, without an authentication unit.

Although the internal construction of a controlled device 200 generally varies from device to device, the device basically comprises a communication unit 270 configured to communicate with the controller 100, a processing unit 280 configured to control the controlled device 200 in accordance with control data received through the communication unit 270 from the controller 100, and a driving unit 290 configured to output driving signals in accordance with control signals received from the processing unit 280. For example, if the control device 200 is controlled by an infrared ray remote controller, such as for a TV set or DVD player, the communication unit 270 may be an infrared ray receiver, the processing unit 280 may be an integrated processor, and the driving unit 290 may be a power switch configured to turn the device on/off, a tuner configured to select TV channels, or a variable resistor configured to control of the TV sound volume, etc.

In the case that the controlled device 200 is a critical one that requires authentication, such as for a door lock, an alarm cancel device, etc., an authentication unit 285 may be provided. The authentication unit 285 stores information for user authentication, while the processing unit 280 confirms whether user authentication information received through the communication unit 270 coincides with the corresponding information stored in the authentication unit 285, while the driving unit 290 drives the device or transmits results of the authentication back to the controller 100 via the communication unit 270.

Now, a description of the operations of the processing units 110, 280 of the controller 100 and of the control device 200 will be discussed below.

Figure 4A:
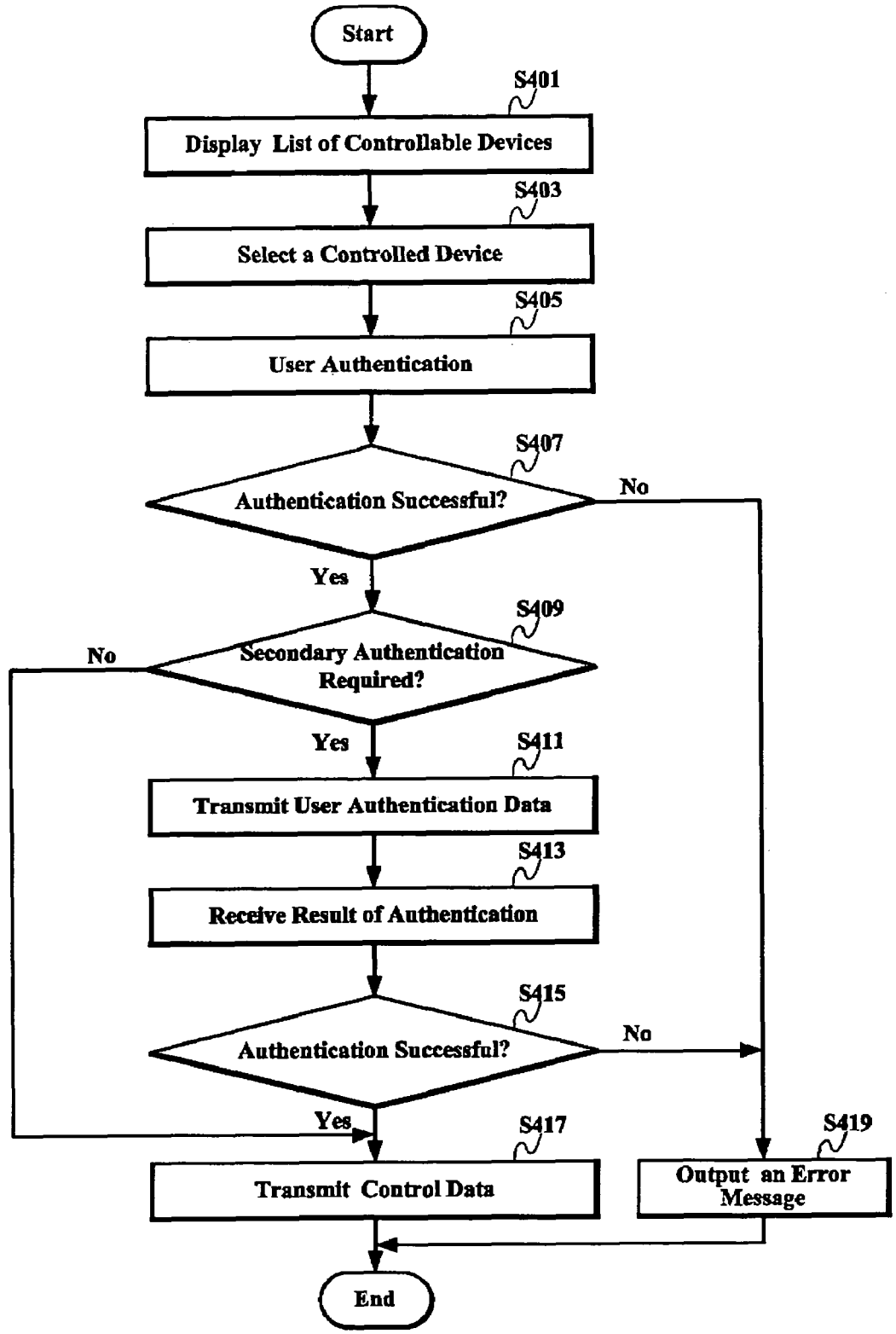
FIG. 4A is a flow chart showing operations of a controller in accordance with an embodiment of the invention.
Figure 4B:
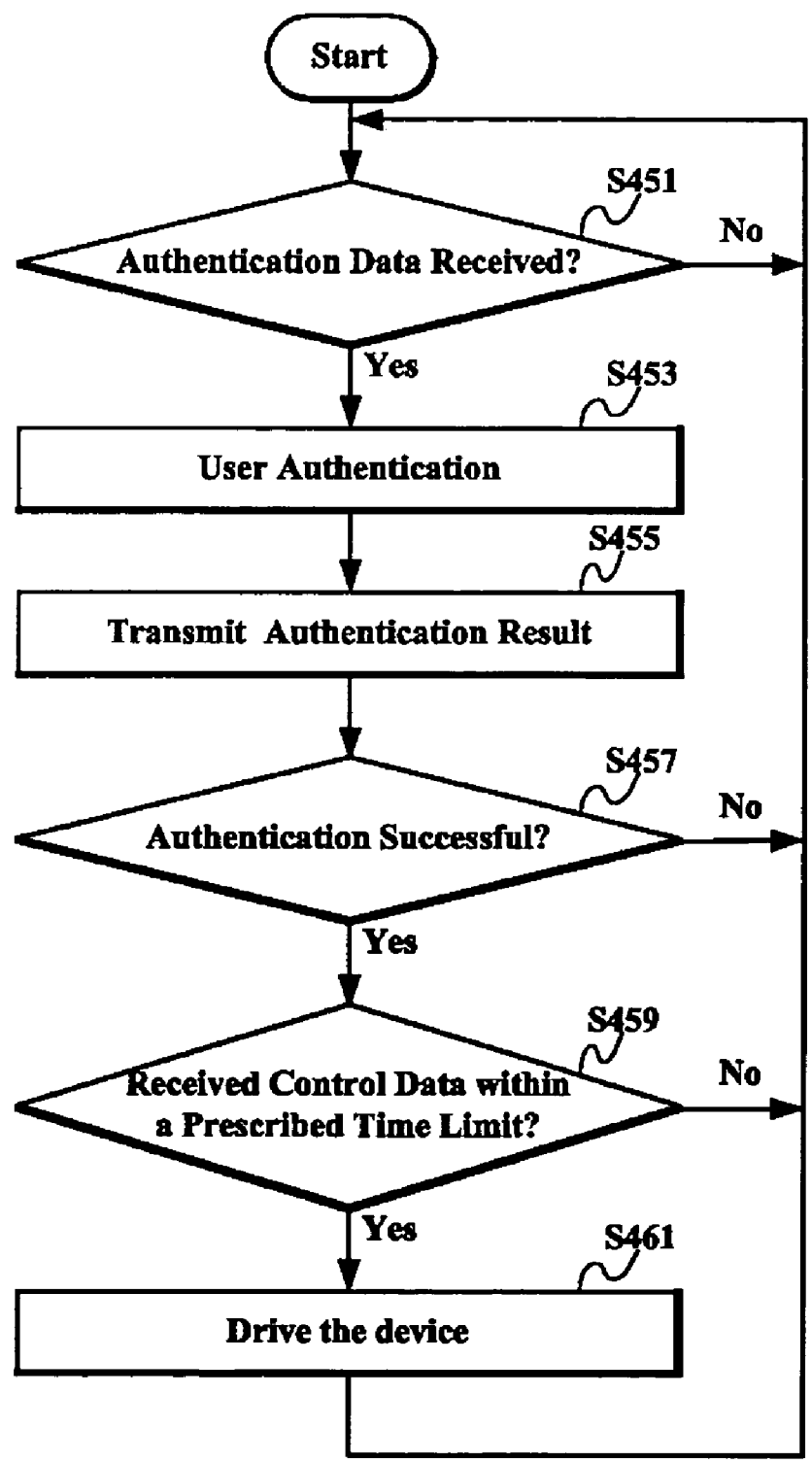
FIG. 4B is a flow chart showing operations of a controlled device having an authentication unit in accordance with another embodiment of the invention.

FIG. 4A is a flow chart showing operations of a controller in accordance with an embodiment of the invention. FIG. 4B is a flow chart showing operations of a controlled device having a secondary authentication unit.

First, a description of operations at the processing unit 110 of the controller 100 is given. The memory unit 140 of the controller 100 stores information on the controlled devices 200, as shown in FIG. 8. Although FIG. 8 includes a column directed to the primary authentication, this column can be omitted if a primary authentication is obligatory.

If a user selects a function for control of the controlled device 200, the processing unit 110 fetches a list of controllable devices from the memory unit 140 and displays the same on the display unit 150, in step S401. FIG. 7 shows an example of such a display screen 150a on the display unit 150. However, if the controller 100 does not include a display unit 150, such as a single line telephone, this step can be omitted.

The user selects a device or a function from the display screen 150a of the display unit 150, as shown in FIG. 7, in step S403, whereupon the processing unit 110 outputs a message to proceed to a (primary) user authentication. Next, the user proceeds to a (primary) user authentication process, for example, by inputting a password or his fingerprint, in step S405.

The processing unit 110 confirms whether information input by the user is, for example, correct by comparing the input password or fingerprint with the corresponding information stored in the memory unit 140, and then, determines if the authentication was successful, in step S407.

The processing unit 110 outputs an error message if the authentication is not successful in step S419. If the authentication is successful, it confirms whether a secondary authentication is required by referring to an information table, such as that shown in FIG. 8, in step S409.

If no secondary authentication is required, the process proceeds to step S417 and control data stored in the memory unit 140 relative to the control function of the selected controlled device 200 is transmitted to the controlled device 200; if, however, a secondary authentication is required, the process proceeds to step S411 and data for user authentication is transmitted to the controlled device 200. In the case where two or more communication units 160A, 160B are provided, the communication unit to which the data is to be transmitted is determined by referring to an information table, such as that shown in FIG. 8.

After the authentication data is transmitted to the controlled device 200, the controlled device 200 performs an authentication by comparing the authentication data received with the corresponding stored authentication data, and then transmits the result to the controller 100. A description of operations of the controlled device 200 follows with reference to FIG. 4B.

After receiving the results of the authentication from the controlled device 200, in step S413, the processing unit 110 of the controller 100 confirms whether the authentication was successful, in step S415. If the authentication was successful, the processing unit 110 transmits control data to the controlled device 200; if the authentication was not successful, the processing unit 110 outputs an error message, in step S419.

FIG. 4B is a flow chart showing the operations of a controlled device 200 having a secondary authentication according to an embodiment of the invention. Since the controlled device 200 requiring no secondary authentication can be driven immediately upon receiving the control data, further description is omitted.

After having confirmed whether authentication data is received from the controller 100, in step S451, the processing unit 280 of a controlled device 200 confirms whether the received authentication data coincides with the corresponding authentication data stored in the authentication unit 285, in step S453, and then, transmits the result to the controller 100, in step S455.

The processing unit 280 waits for control data from the controller 100 in step S457, if the user authentication at step S453 was successful. If the authentication was not successful, the unit 288 returns to the beginning and waits for an authentication data, in step S451.

In the case in which control data has not been received from the controller 100 within a predetermined time period, in step S459, the process returns to the beginning step and waits for an authentication data, in step S451. If control data has been received within a predetermined time period, the processing unit 280 drives the driving unit 290 in accordance with the received control data, in step S461, and then a remote control process of the control device 200 is terminated. After the control device has been driven, the process returns to step S451 and the above procedure is repeated.

Figure 5A:
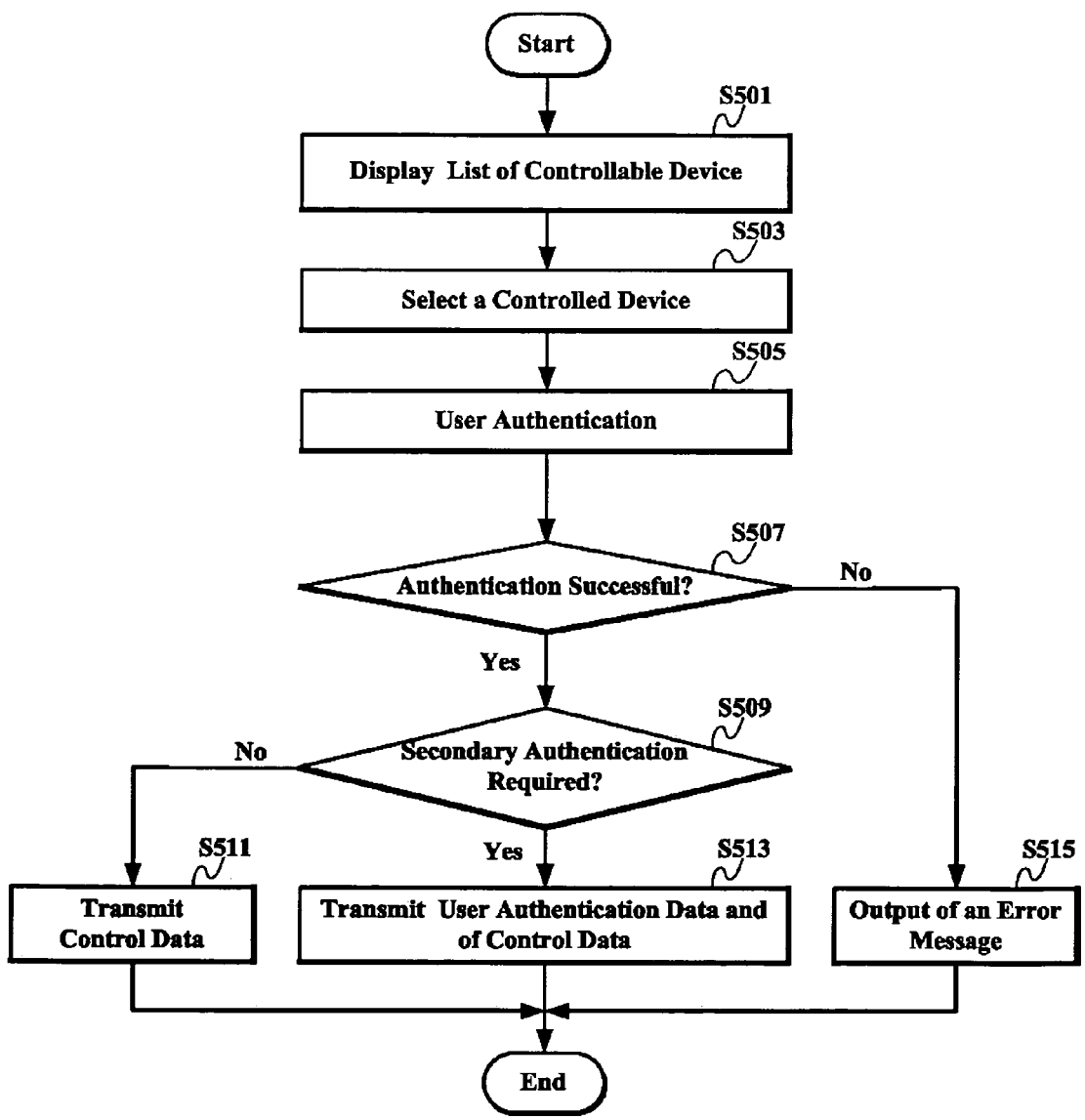
FIG. 5A is a flow chart showing operations of a controller in accordance with another embodiment of the invention.
Figure 5B:
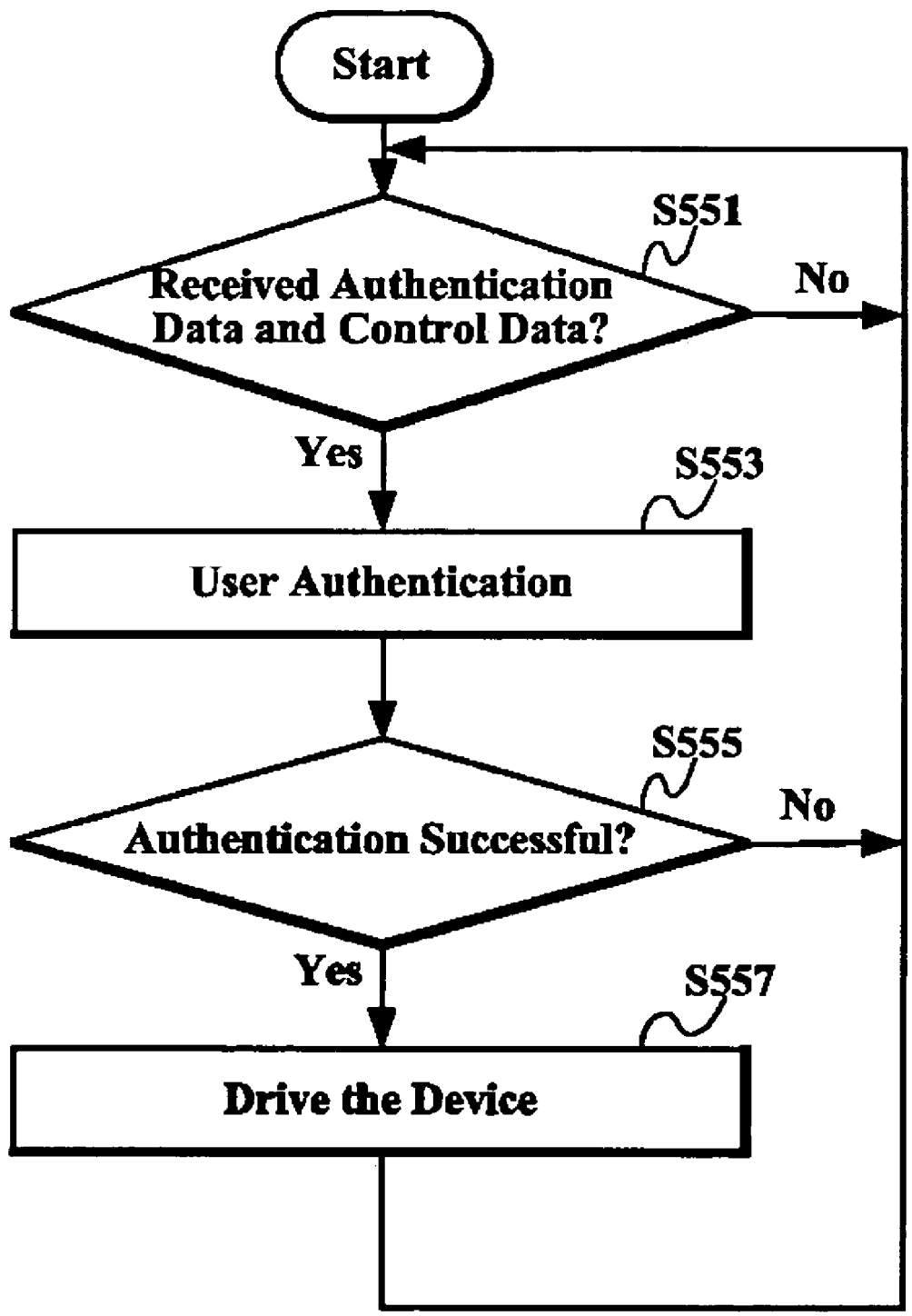
FIG. 5B is a flow chart showing operations of a controlled device having an authentication unit in accordance with another embodiment of the invention.

FIG. 5A is a flow chart showing operations of a controller 100 in accordance with another embodiment of the invention. FIG. 5B is a flow chart showing operations of a controlled device 200 in accordance with another embodiment of the invention having a secondary authentication unit. This embodiment differs from the previously discussed embodiment in that user authentication data is transmitted together with control data to the controlled device 200.

Next, a description of the operations of processing unit 110 of the controller 100 is given below.

If a user selects a function for control of the controlled device 200, the processing unit 110 fetches a list of controllable devices from the memory unit 140 and displays the same on the display unit 150, in step S501. FIG. 7 shows an example of such a display screen 150A on a display unit 150. However, if the controller 100 does not include a display unit 150, such as a single line telephone, this step may be omitted.

The user selects a device or a function from the screen 150A, as shown in FIG. 7, in step S503, whereupon the processing unit 110 outputs a message to proceed to a (primary) user authentication, so that the user proceeds to a (primary) user authentication process, for example, by inputting a password or his fingerprint in step S505.

The processing unit 110 confirms whether information input by the user is correct, for example, by comparing the input password or fingerprint with the corresponding information stored in the memory unit 140, and then, determines if the authentication was successful, in step S507.

The processing unit 110 outputs an error message, if the authentication was not successful, in step S515, while it confirms whether a secondary authentication is required, referring to an information table, such as that shown in FIG. 8, if the authentication was successful, in step S509.

If no secondary authentication is required, the process proceeds to step S511 and the processing unit 110 transmits control data to the controlled device 200; if, however, a secondary authentication is required, the process proceeds to step S513 and data for user authentication, as well as control data, are transmitted to the controlled device 200.

A flow chart showing operations of a controlled device 200 requiring a secondary authentication in accordance with another embodiment is illustrated in FIG. 5B. Since a controlled device 200 requiring no secondary authentication can be driven immediately upon receiving the control data a further description is omitted.

The processing unit 280 of the control device 200 waits for authentication data as well as control data from the controller 100, in step S551. The processing unit 280 confirms whether the received authentication data coincides with the corresponding authentication data stored in the authentication unit 285, after the authentication data and the control data have been received, in step S553. The processing unit 280 then drives the device in accordance with the control data, if the authentication was successful, in step S557, while it returns to the beginning step and waits for authentication data and control data, if the authentication was not successful, in step S551. After driving the device, in step S557, the process returns to step S551 and the above procedure is repeated.

Although a primary authentication was obligatory in the above described embodiments, the primary authentication process can be omitted depending on the type of control device 200, as exemplified in FIG. 8. In such a case, an additional step of confirming whether a primary authentication is required could be added after the step of selecting a controlled device in step S403, S504 in the flow chart of FIGS. 4A, 5A.

FIG. 6 is a flow chart showing operations of a controller 100 having the steps shown in FIG. 5A, as well as an additional step of confirming whether a primary authentication is required.

If a user selects a function for control of the controlled device 200, the processing unit 110 fetches a list of controllable devices from the memory unit 140 and displays the same on the display unit 150, in step S601. FIG. 7 shows an example of a display screen 150A of a display unit 150. However, if the controller 100 does not include a display unit 150, such as a single line telephone, this step can be omitted.

The user selects a device or a function from the screen 150A, as shown in FIG. 7, in step S603, whereupon the processing unit 110 determines whether a primary authentication is required, referring to information stored in the memory unit 140 on the controlled device 200, as shown in FIG. 8, in step S604.

If a primary authentication is required, the processing unit 110 outputs a message to proceed to a (primary) user authentication, so that the user proceeds to a (primary) user authentication process, for example, by inputting a password or his fingerprint, in step S605. The processing unit 110 confirms whether information inputted by the user is correct, for example, by comparing the input password or fingerprint with the corresponding information stored in the memory unit 140, and then, determines if the authentication was successful, in step S607.

In cases where no primary authentication is required, steps S605 and S607 can be omitted.

The processing unit 110 outputs an error message, if the authentication was not successful, in step S615, while it confirms whether the controlled device requires a secondary authentication, if the authentication was successful, in step S609.

Since the process steps after step S609 are the same as the corresponding process steps after step S509 in FIG. 5A, a further explanation is omitted. Further, since operations at the controlled device 200 are the same as those in FIG. 5B, a further explanation is omitted.

The invention provides at least the following advantages.

As described above, the invention provides a user authentication method that allows selection of a level of user authentication based on the importance of a device to be controlled, when a plurality of devices are controlled by a single controller, and a remote control apparatus capable of using this method. That is, the invention allows a plurality of controlled devices to be controlled by one single controller, whereby a level of user authentication is determined by an importance of the controlled device or a function thereof, so that convenience can be increased for devices or functions of low importance, while security can be enhanced for devices or functions of high importance.

Furthermore, the invention provides convenience in use in that it allows one single controller to control various devices which adopt divergent communication devices or means. For example, with a single PDA to which the invention applies, controlled devices using both infrared rays, such as TV set, audio system, DVD player, etc., and those using radio signals, such as electronic door locks, can be controlled.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A user authentication method for a remote control apparatus, comprising:
    performing a first user authentication process after a user has input a command for control of a controlled device;
    confirming whether a secondary authentication for said controlled device is required, if said first user authentication was successful; and
    performing a secondary authentication process if the secondary authentication process is necessary, wherein confirming whether a secondary authentication for said controlled device is required, if said first user authentication was successful, is based on a type of controlled device.

2. The user authentication method of claim 1, wherein performing a first user authentication process comprises:
    comparing user authentication information input by a user with corresponding stored user authentication information.

3. The user authentication method of claim 2, wherein comparing user authentication information comprises:
    confirming whether said controlled device requires a primary authentication, upon input of a command for control of said controlled device by said user;
    receiving information for user authentication; and
    comparing said received information with the corresponding user authentication information stored, if a primary authentication is required.

4. The user authentication method of claim 1, wherein performing a secondary authentication process if the secondary authentication process is necessary comprises:
- transmitting an authentication data to said controlled device if a secondary authentication is required, wherein the controlled device compares the authentication data to stored data.

5. The user authentication method of claim 4, wherein the method further comprises:
- transmitting a control data that corresponds to said user's command to said controlled device, after notification has been received from said controlled device that said secondary authentication was successful.

6. The user authentication method of claim 5, wherein transmitting a control data comprises:
- accessing information from a memory device regarding a communication device associated with said controlled device; and
- transmitting data through said communication device.

7. The user authentication method of claim 4, wherein the authentication data comprises biometric information.

8. The user authentication method of claim 1, wherein the controlled device provides a notification that the secondary authentication was successful.

9. A user authentication method for a remote control apparatus, comprising:
- performing a first user authentication process after a user has input a command for control of a controlled device;
- confirming whether a secondary authentication for said controlled device is required, if said first user authentication was successful; and
- performing a secondary authentication process if the secondary authentication process is necessary, said method further comprising:
- transmitting authentication data and control data corresponding to said user's command to the controlled device, if a secondary authentication is required; and
- operating the controlled device in accordance with said transmitted control data, if authentication at the controlled device with said authentication data was successful.

10. The user authentication method of claim 9, wherein confirming whether a secondary authentication for said controlled device is required, if said user authentication was successful, is based on the type of controlled device.

11. The user authentication method of claim 9, wherein performing a first user authentication process comprises:
- comparing user authentication information input by a user with corresponding stored user authentication information.

12. The user authentication method of claim 11, wherein comparing user authentication information includes:
- confirming whether said controlled device requires a primary authentication, upon input of a command for control of said controlled device by said user;
- receiving information for said user authentication; and
- comparing said received information with the corresponding user authentication information stored, if a primary authentication is required.

13. The user authentication method of claim 9, wherein performing a secondary authentication process, if the secondary authentication process is necessary, comprises:
- transmitting an authentication data to said controlled device if a secondary authentication is required, wherein the controlled device compares the authentication data to stored data.

14. The user authentication method of claim 13, wherein the controlled device provides a notification that the secondary authentication was successful.

15. The user authentication method of claim 13, wherein the authentication device comprises biometric information.

16. The user authentication method for remote control of claim 9, wherein transmitting authentication and control data comprises:
- accessing information from a memory device regarding a communication associated with said control device; and
- transmitting data through said communication device.

17. A remote control apparatus, comprising:
- means for performing a first user authentication process after a user has input a command for control of a controlled device;
- means for confirming whether a secondary authentication for said controlled device is required, if said first user authentication was successful; and
- means for performing a secondary authentication process if the secondary authentication process is necessary, wherein confirming whether a secondary authentication for said controlled device is required, if said first user authentication was successful, is based on a type of controlled device.

18. A remote control apparatus, comprising:
- an input device configured for input of information by a user;
- a memory configured to store control data for at least one controllable device, primary and secondary authentication information for said controllable device, and authentication data for user authentication;
- a communication device configured to transmit control data of said controllable device; and
- a processor configured to confirm whether primary and secondary authentication is required for said controllable device on a basis of a type of said controllable device, and to perform the primary and secondary authentication.

19. The remote control apparatus of claim 18, further comprising a display device configured to display a list of a plurality of controllable devices having control data stored in said memory.

20. The remote control apparatus of claim 18, wherein the input device comprises a biometric information input device configured to input biometric information of a user.

21. The remote control apparatus of claim 18, wherein said remote control apparatus comprises two or more communication devices, and wherein information on said communication devices is stored in said memory.

22. The remote control apparatus of claim 21, wherein said remote control apparatus comprises a PDA, and said two or more communication devices comprise an infrared ray communication interface and a mobile communication network interface.

23. The remote control apparatus of claim 21, wherein said remote control apparatus comprises a mobile telephone, and said two or more communication devices comprise a mobile communication network interface and a Bluetooth interface.

* * * * *